United States Patent [19]

Lui et al.

[11] Patent Number: 4,764,340

[45] Date of Patent: Aug. 16, 1988

[54] FUEL ASSEMBLY STRESS RELIEVING FASTENER

[75] Inventors: Chun K. Lui, Monroeville; Leonard T. Gesinski, North Huntingdon, both of Pa.

[73] Assignee: Westinghouse Electric Corp., Pittsburgh, Pa.

[21] Appl. No.: 925,766

[22] Filed: Oct. 31, 1986

[51] Int. Cl.$^4$ .............................................. G21C 3/32
[52] U.S. Cl. .................................. 376/434; 376/285; 376/445; 376/446; 403/30; 403/41; 403/279; 411/186; 411/189
[58] Field of Search ............... 376/285, 445, 446, 434, 376/438; 403/30, 41, 279; 411/185, 186, 189, 368, 544

[56] References Cited

U.S. PATENT DOCUMENTS

| | | |
|---|---|---|
| 269,412 | 12/1882 | Heaton ................................ 403/279 |
| 1,156,798 | 10/1915 | Meaker . |
| 1,635,082 | 7/1927 | Hultgren et al. .................... 411/189 |
| 1,966,044 | 7/1934 | Place et al. ........................ 411/189 |
| 2,375,325 | 5/1945 | Robertson . |
| 3,053,300 | 9/1962 | Quinto ................................. 403/279 |
| 3,366,546 | 1/1968 | Anthony et al. . |
| 3,715,274 | 2/1973 | Venier et al. ....................... 376/446 |
| 3,953,287 | 4/1976 | Long et al. . |
| 4,126,170 | 11/1978 | DeHaitre . |
| 4,189,348 | 2/1980 | Donck et al. . |
| 4,269,248 | 5/1981 | MacLean et al. . |
| 4,416,848 | 11/1983 | Feutrel . |
| 4,452,755 | 6/1984 | Hylton . |
| 4,499,047 | 2/1985 | Borrman et al. . |

OTHER PUBLICATIONS

Copending patent application Ser. No. 775,209, filed 9-12-85, J. Wilson, "Top Nozzle Mounted Reusable Fastener Device in a Reconstitutable Nuclear Fuel Assembly".

Primary Examiner—Deborah L. Kyle
Assistant Examiner—Richard W. Wendtland

[57] ABSTRACT

A device for relieving thermally induced stresses developed in a nuclear fuel assembly during reactor heatup is disclosed herein. The device generally comprises a stress relieving fastener capable of connecting a fuel assembly top nozzle, which may be stainless steel, to a threaded stud, which may be Zircaloy. The stud is attached to a fuel assembly channel. The fastener includes a threaded nut having a deformable portion for relieving thermally induced stresses developed in the stud by the differential thermal expansion of the top nozzle and stud. In a first embodiment of the nut, the deformable portion comprises a circumferential, deformable ridge which is substantially recessed from the marginal edge of the nut and which is disposed on the bottom most surface of the nut. The ridge contacts the top nozzle when the nut threadedly engages the stud. A second embodiment of the nut is similar to the first embodiment except that the deformable ridge is disposed flush with the marginal edge of the nut. The deformable portion in the second embodiment may also include a circumferential, deformable first groove which is formed in the lower portion of the nut. In addition, the second embodiment may include a deformable second groove formed in the bottom most surface of the nut. During reactor heatup, thermally induced stresses may develop in the stud. The deformable portion of the nut deforms, thereby relieving the thermally induced stresses.

31 Claims, 3 Drawing Sheets

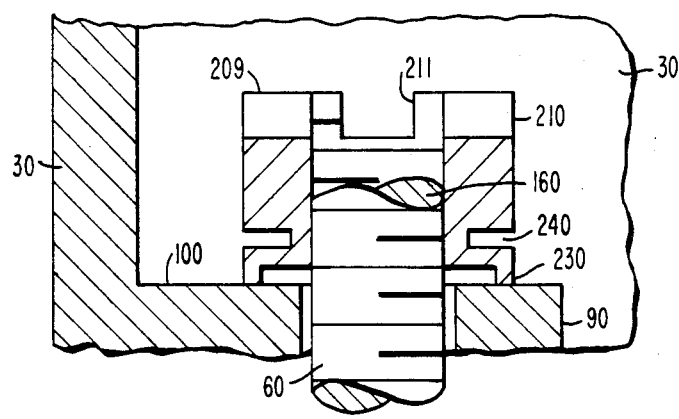
FIG.4
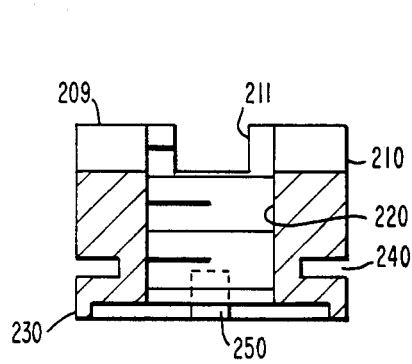
FIG.5
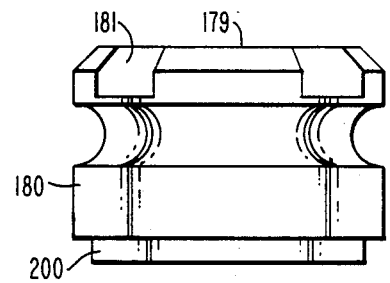
FIG.7
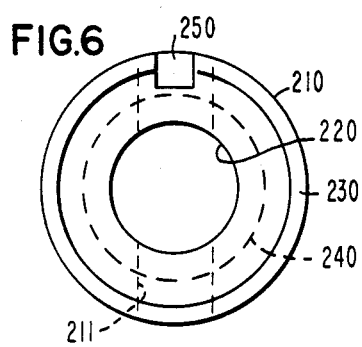
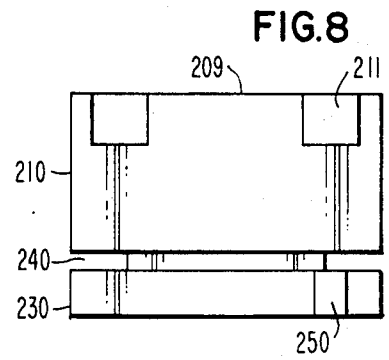
FIG.8

FUEL ASSEMBLY STRESS RELIEVING FASTENER

BACKGROUND OF THE INVENTION

This device relates to a nuclear fuel assembly having a stress relieving fastener and more particularly to a nuclear fuel assembly having a stress relieving fastener for relieving thermally induced stresses developed in a nuclear fuel assembly when the fuel assembly is disposed in a nuclear reactor and when the nuclear reactor is brought to its operating temperature.

It is well known that when a solid member is subjected to a change in temperature it will either expand or contract. If the expansion or contraction is prevented or restrained, thermal stresses will develop in the member. The thermal stresses developed in the member will be a function of its geometry and the temperature distribution within the member. When the member is disposed in a nuclear reactor, the member may undergo changes in temperature distribution and thus may experience thermal stresses either during reactor startup, shutdown, transient conditions or non-steady state reactor operation.

A nuclear reactor is a device for generating heat from the controlled fission of nuclear material such as uranium or plutonium bearing compounds. The nuclear material is typically in the form of fuel pellets that are housed in cylindrical fuel rods which are traditionally arranged in a square pitch array. The fuel rods are in turn disposed in the fuel assembly which is a means for containing the fuel rods. A plurality of fuel assemblies are disposed in the nuclear reactor. The fuel assembly generally comprises a top nozzle, a channel and a bottom nozzle. The top nozzle is mounted on the channel by studs which are attached to the channel. The studs and channel may be formed from a material such as Zircaloy and the top nozzle may be formed from a different material such as stainless steel. Each stud may be attached to the top nozzle by a fastener which may be 316 stainless steel.

In the operating temperature range of the typical nuclear reactor, the coefficient of linear thermal expansion, commonly referred to in the art as the thermal expansion rate, for stainless steel is approximately three times that of Zircaloy. Therefore, the thermal expansion rate for the stainless steel top nozzle is approximately three times that of the Zircaloy studs. Hence, when the nuclear reactor is brought to its operating temperature, differential thermal expansion of the studs and top nozzle may produce potentially undesirable high thermal stresses in the studs. Consequently, a means is needed to mitigate these potentially undesirable thermal stresses.

Traditional solutions such as the use of a belleville washer are not feasible due to the limited space available in the reactor and due to the undesirable potential of additional, small loose parts becoming separated from the fuel assembly during fuel assembly reconstitution.

One prior art solution for relieving potentially undesirable thermal stresses was employed in demonstration assemblies delivered to an operating nuclear power plant in 1985. This solution entailed placing a carefully controlled gap between a fastening nut and the top nozzle. In this manner the top nozzle was allowed to expand without restraint during reactor heatup due to the presence of the gap; hence, the gap mitigated development of potentially undesirable thermal stresses. However, achieving the proper size of the gap was difficult to control particularly if the gap sizing operation was performed remotely and under water. Although this solution can be most conveniently used for fresh, non-irradiated fuel assemblies, a more convenient solution is needed for irradiated assemblies. A more convenient solution is particularly needed in the instance of irradiated assemblies where it is necessary to remotely attach the fastening nut to the stud under water.

There are several devices known in the art for attaching two or more members by utilizing a fastening nut; however, many of these devices are not appropriate for remotely attaching a nuclear fuel assembly top nozzle to a fuel assembly channel such that thermal stresses are relieved during reactor heatup.

One such device known in the art for attaching two or more members by utilizing a fastening nut is disclosed by U.S. Pat. No. 4,189,348 issued Feb. 19, 1980 in the name of Harry A. Donck et al. and entitled "Fuel Rod Assembly To Manifold Attachment" which is assigned to the General Atomic Company. This patent discloses a fuel rod assembly having fuel rods and an upper sealing surface. The fuel rods extend through openings in the sealing surface and are held in place by cap nuts. Each nut has a deformable portion for locking each rod to the sealing surface to prevent loosening of the nut. In an alternative embodiment of this device, the nut uses a deformable flange which projects radially outward from the base of the nut for locking the nut and a beam. The function of this device is to seal gaseous fission products and to allow the flow of these fission products from the fuel rods to a vent manifold passageway.

Another device known in the art for attaching two or more members by using a fastening nut is disclosed by U.S. Pat. No. 4,499,047 issued Feb. 12, 1985 in the name of Bo Borrman et al. and entitled "Fuel Assembly With A Top Plate Arranged Above The Upper End Surfaces Of The Fuel Rods" which is assigned to AB Asea-Atom. This patent discloses a fuel assembly with a top plate arranged above the upper end surfaces of the fuel rods. The top plate is secured in place by a helical spring and a nut. A locking washer is arranged between the helical spring and the nut to increase resiliency in the movement of the upper plate. Therefore, this device utilizes a nut and washer that do not have deformable portions specifically capable of relieving thermally induced stresses.

A fastener having a flexible portion is disclosed by U.S. Pat. No. 4,269,248 issued May 26, 1981 in the name of Barry L. MacLean et al. and entitled "Fastener With Flexible Flange" which is assigned to the MacLean-Fogg Company. This patent discloses a fastener having a nut portion with a bearing surface defined at least in part by a flange that is bowed and that extends radially outward from the base of the nut. Segments of the bearing surface and flange are flexible and resilient so that when the fastener is tightened against a workpiece, deflection of the resilient segments compensates for loss of tension. Therefore, this device comprises a fastener wherein each resilient flange segment is bowed and extends radially outward from the base of the nut for securely tightening the fastener against a workpiece.

U.S. Pat. No. 2,375,325 issued May 8, 1945 in the name of Edward Roker Robertson assignor to Oliver Edwin Simmonds and entitled "Self-Locking Nut" discloses a nut having a flexible diaphram portion. This two-piece nut comprises a nut portion and a locking member which is formed separately from the nut portion wherein the locking member has a flexible diaphram. Therefore, this device has more than one element, wherein one of the elements is the flexible diaphram for securing the nut and a bolt tightly together. Consequently, if disposed in a nuclear reactor, the two-piece construction of this device has the undesirable potential for producing a loose part in the reactor should the two pieces comprising the device separate.

A sealing nut having a compressible insert is disclosed by U.S. Pat. No. 4,126,170 issued Nov. 21, 1978 in the name of Lon DeHaitre and entitled "Sealing Nut With Preformed Turtleneck Insert" which is assigned to the Abbott Screw and Manufacturing Company. This patent discloses a sealing nut capable of withstanding high pressures and having a compressible insert disposed in its working face which contacts a bearing surface when the nut is engaged on a stud. The nut is for locking and sealing the stud in place. The compressible portion of this device is not integrally formed with the nut body and the function of the nut is primarily to seal and lock rather than primarily to relieve thermally induced stresses. Consequently, if disposed in a nuclear reactor, this device has the undesirable potential for producing a loose part in the reactor should the insert become disengaged from the nut body.

U.S. Pat. No. 1,156,798 issued Oct. 12, 1915 in the name of John W. Meaker entitled "Nut" discloses a nut having a flange. In this patent the nut has a flange on its working face which contacts a bearing surface. The flange portion of this device is turned outwardly from the nut body.

SUMMARY OF THE INVENTION

A device for relieving thermally induced stresses developed in a nuclear fuel assembly during reactor heatup is disclosed herein. The device generally comprises a stress relieving fastener capable of connecting a fuel assembly top nozzle, which may be stainless steel, to a threaded stud, which may be Zircaloy. The stud may be attached to a fuel assembly channel. The fastener includes a threaded nut having a deformable portion for relieving thermally induced stresses developed in the stud by the differential thermal expansion of the top nozzle and stud. In a first embodiment of the nut, the deformable portion comprises a circumferential, deformable ridge which is substantially recessed from the marginal edge of the nut and which is disposed on the bottom most surface of the nut. The ridge contacts the top nozzle when the nut threadedly engages the stud. A second embodiment of the nut is similar to the first embodiment except that the deformable ridge is disposed flush with the marginal edge of the nut. The deformable portion in the second embodiment may also include a circumferential, deformable first groove which is formed in the lower portion of the nut. In addition, the second embodiment of the nut may include a deformable second groove formed in the bottommost surface of the nut. During reactor heatup, thermally induced stresses may develop in the stud. The deformable portion of the nut deforms, thereby relieving the thermally induced stresses.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings wherein:

FIG. 4 is a view similar to that of FIG. 3 but illustrating a second embodiment of the nut engaging the stud and contacting the first nozzle.

FIG. 5 is a cross-sectional view of the second embodiment of the nut.

FIG. 6 is a view of the bottom end of the second embodiment of the nut.

FIG. 7 is a perspective view of the first embodiment of the nut illustrating a deformable portion thereon.

FIG. 8 is a perspective view of the second embodiment of the nut illustrating a deformable portion thereon.

DESCRIPTION OF THE PREFERRED EMBODIMENT

Relief of thermally induced stresses in a nuclear fuel assembly may require the use of a stress relieving fastener. The invention described herein is a nuclear fuel assembly stress relieving fastener capable of relieving thermally induced stresses developed in a nuclear fuel assembly when the nuclear fuel assembly is disposed in a nuclear reactor and when the nuclear reactor is brought to its operating temperature.

A more satisfactory solution to the problems described above in the Background of the Invention is to employ a stress relieving fastener for attaching a first nozzle to a stud; the fastener having a deformable portion for relieving thermally induced stresses developed in the stud by the differential thermal expansion of the stud and the first nozzle.

Therefore, this device comprises a stress relieving fastener nut which may include a small, thin and deformable ring disposed on the seating surface of the nut whereby the deformable ring contacts the first nozzle. This ring is machined integrally with the nut such that there is no potential for additional loose parts in the fuel assembly. During the process of mounting the first nozzle on the channel, the nuts are torqued on the studs to provide a small preload between the first nozzle and the channel. This eliminates the need for a small gap between the nut and the first nozzle.

A joint, which is herein defined by the nut, stud, and first nozzle tightens as the fuel assembly is heated when the reactor is brought to its operating temperature. As the temperature increases, the yield and ultimate strengths of the nut are substantially reduced. The tightening of the joint and the reduction in yield and ultimate strengths cause the ring on the seating surface of the nut to deform. The deformation of the ring limits the thermal stresses in the studs to desirable levels.

Figure 1:
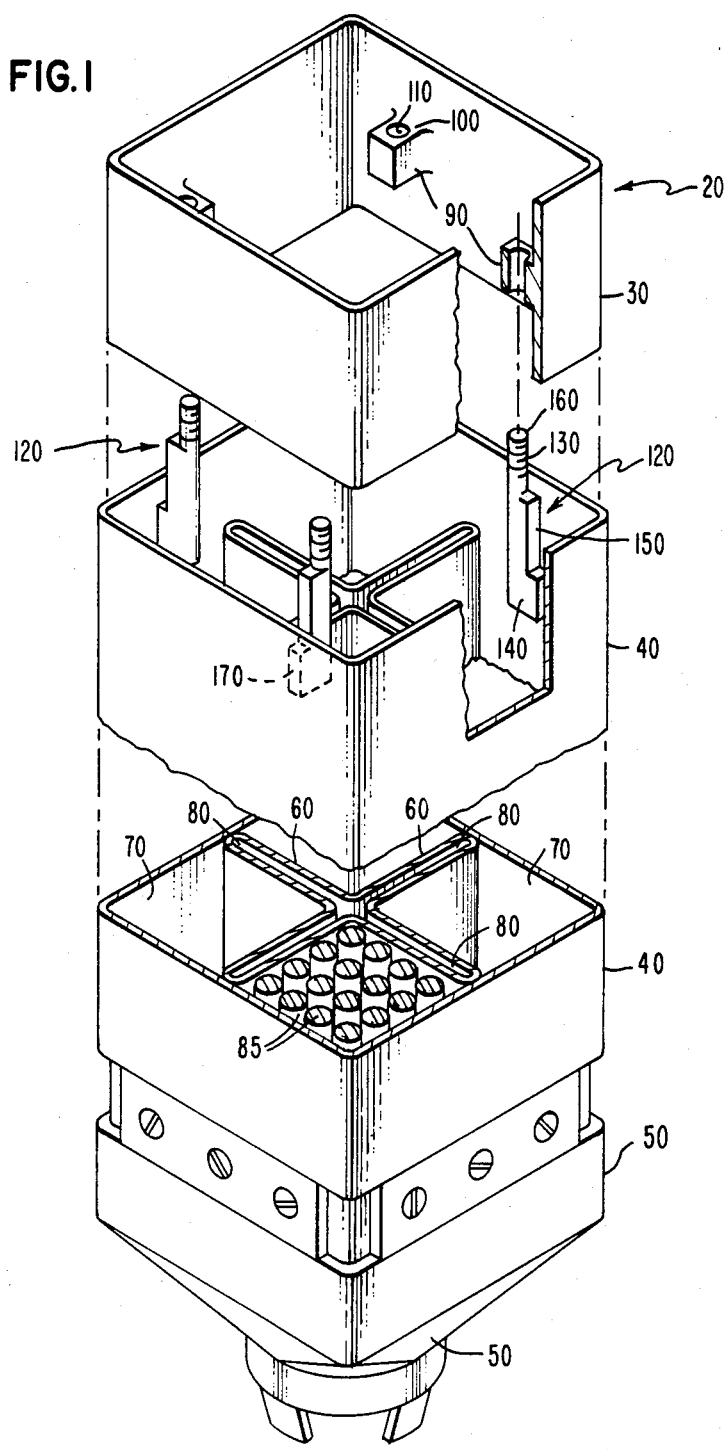
FIG. 1 is a view in perspective of a nuclear fuel assembly with parts removed in the interest of clarity.

Referring to FIG. 1, the nuclear fuel assembly is referred to generally as 20 and comprises a first material first nozzle 30, a second material channel 40 and a first material second nozzle 50. The first nozzle 30, which may be 304L stainless steel, may be an elongated square approximately 5.5 inches on each side and approximately 4 inches in length. Channel 40, which may be Zircaloy, is disposed such that first nozzle 30 is mounted thereon. The channel 40 may be an elongated square approximately 5.5 inches on each side and approximately 16.8 inches in length. Attached, which may be by a plurality of Inconel-800 screws, to the lower portion of channel 40 is second nozzle 50, which may be 304L stainless steel. The second nozzle 50 may be a substantially elongated square approximately 5.5 inches on each side and 5.8 inches in length and having a substantially tapered lower end portion. The channel 40 is disposed substantially in vertical alignment with first nozzle 30 and with second nozzle 50.

Again referring to FIG. 1, a water cross 60 which may be of the type generally used in the art is disposed in fuel assembly 20 and extends from near first nozzle 30 to near second nozzle 50, which water cross 60 defines a plurality of elongated chambers 70 extending the length of water cross 60. Water cross 60 generally comprises eight sides substantially defining a cross-shaped cavity 80 which is disposed in a horizontal plane perpendicular to the vertical axis of fuel assembly 20. Disposed in cavity 80 is a substance, such as water, for moderating neutrons produced by the fission of nuclear material. Disposed in each chamber 70 and extending substantially the length thereof is a plurality of cylindrical fuel rods 85 having nuclear fuel material therein.

Figure 2:
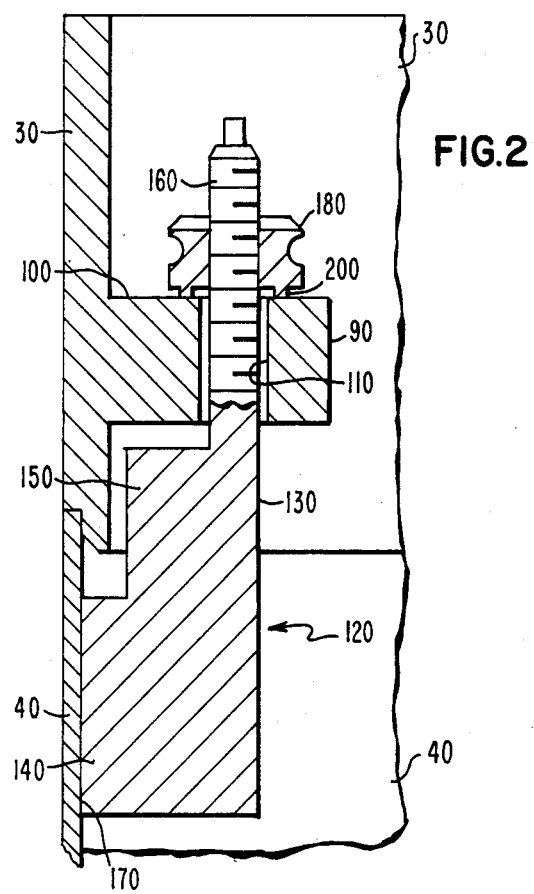
FIG. 2 is a cross-sectional view in partial elevation of an upper portion of the nuclear fuel assembly illustrating a stress relieving fastener comprising a first embodiment of a nut engaging a stud and illustrating a working arrangement of the nut, the stud, a first nozzle and a channel.

Referring to FIGS. 1 and 2, disposed in first nozzle 30 is a bearing member 90, which may be integrally formed with first nozzle 30, horizontally extending a predetermined distance from an inside vertical surface of first nozzle 30 and having an upwardly facing bearing surface 100 disposed thereon. Extending through bearing member 90 and bearing surface 100 is a vertical continuous aperture 110 for receiving an attachment device generally referred to as 120, which attachment device is capable of attaching channel 40 to first nozzle 30. Attachment device 120, which may be Zircaloy, may comprise a substantially L-shaped stud 130 having a horizontal leg 140 integrally formed with a vertical leg 150 which is disposed perpendicularly to horizontal leg 140. Disposed about a predetermined upper portion of the external surface of vertical leg 150 is a plurality of helically aligned longitudinal threads 160. An end 170 of horizontal leg 140 is attached, which may be by welding, to an inside surface of channel 40 at a predetermined location above fuel rods 85 such that leg 150 and threads 160 extend through aperture 110.

Figure 3:
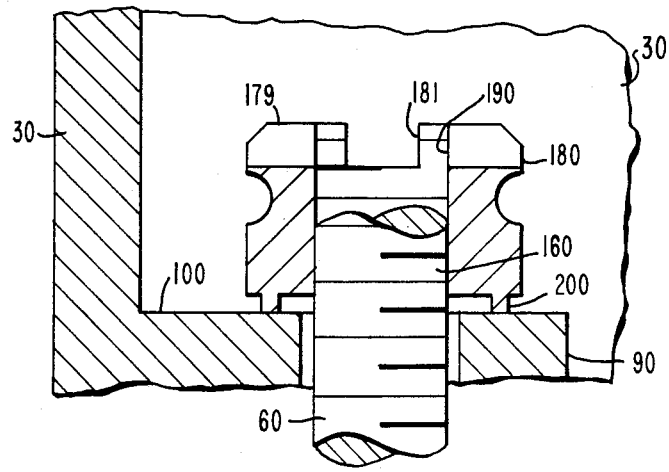
FIG. 3 is a view in vertical section and partial elevation, illustrating the first embodiment of the nut engaging the stud and contacting the first nozzle.

Referring to FIGS. 2 and 3, engaged on stud 130 is a stress relieving fastener comprising a first embodiment of a nut 180 having a screw threaded bore 190 formed therethrough, which bore 190 matingly engages threads 160. Formed in a top-most surface 179 of nut 180 is a substantially rectangular first slot 181 having predetermined height and width and extending from one marginal edge of top-most surface 179 to the other marginal edge thereof. Slot 181 is capable of providing a means for engaging nut 180 on stud 130. Disposed on nut 180 is a deformable ridge 200 contacting bearing surface 100 when nut 180 is engaged on stud 130. The ridge 200, which is shown in FIGS. 3 and 7, is capable of deforming for relieving thermally induced stresses developed in stud 130. The ridge 200, which may be substantially recessed from the marginal edge of nut 180 downwardly extends a predetermined distance from the bottom surface of nut 180 and extends substantially circumferentially around the bottom surface of nut 180.

Referring to FIGS. 4-6, engaged on stud 130 is a stress relieving fastener comprising a second embodiment of a nut 210 having a screw threaded bore 220 therethrough, which bore 220 matingly engages threads 160. Formed in a top-most surface 209 of nut 210 is a substantially rectangular second slot 211 have predetermined height and width and extending from one marginal edge of top-most surface 209 to the other marginal edge thereof. Slot 211 is capable of providing a means for engaging nut 210 on stud 130. Disposed on nut 210 is a deformable portion which may comprise a circumferential, deformable ridge 230 contacting bearing surface 100 when nut 210 is engaged on stud 130. As shown in FIGS. 5, 6 and 8, ridge 230, which may be disposed substantially flush with the marginal edge of nut 210 downwardly extends a predetermined distance from the bottom surface of nut 210 and extends substantially circumferentially around the bottom surface of nut 210. Referring to FIGS. 5, 6 and 8, the deformable portion of nut 210 may further comprise a circumferential, deformable first groove 240 having a predetermined height and formed in the lower portion of nut 210. First groove 240 extends substantially circumferentially around the external surface of nut 210 and horizontally extends from the marginal edge of nut 210 to substantially near the central longitudinal axis of nut 210. Again referring to FIGS. 5, 6 and 8, the deformable portion may further comprise a second groove 250 having predetermined height and width and formed in the bottom portion of nut 210 and horizontally extending from substantially near the marginal edge of nut 210 to substantially near the central longitudinal axis of nut 210. When reactor heatup occurs, thermal expansion occurs in stud 130 and first nozzle 30 causing ridge 230, first groove 240 and second groove 250 to deform such that the thermally induced stresses in stud 130 are relieved.

During reactor heatup, stainless steel first nozzle 30 expands at a different rate than Zircaloy stud 130 because the thermal expansion rate for stainless steel is approximately three times that of Zircaloy. When the first embodiment of the nut is utilized, as the temperature of fuel assembly 20 increases, the joint defined by nut 180, stud 130 and first nozzle 30 tightens due to the differential thermal expansion rate between stud 130 and first nozzle 30. Thermal stresses develop in stud 130 because the expansion of first nozzle 30 is restrained by nut 180 and stud 130 when nut 180 threadedly engages stud 130 and when ring 200 contacts bearing surface 100. As the temperature increases, the yield and ultimate strengths of nut 180 decrease. Therefore, due to the joint tightening and due to the decrease in the yield and ultimate strengths of nut 180, ring 200 deforms thereby reducing the thermal stresses developed in stud 130. Similarly, when the second embodiment of the nut is utilized, as the temperature of fuel assembly 20 increases, the joint defined by nut 210, stud 130 and first nozzle 30 tightens, thereby deforming ridge 230, first groove 240 and second groove 250 such that thermally indluced stresses in stud 130 are relieved.

Therefore, the invention described herein provides a nuclear fuel assembly stress relieving fastener for relieving thermally induced stresses developed in a nuclear fuel assembly when the fuel assembly is disposed in a nuclear reactor and when the reactor is brought to its operating temperature.

What is claimed is:

1. A nuclear fuel assembly comprising:
   (a) a first material first nozzle having a bearing surface disposed thereon;
   (b) a second material channel having said first nozzle disposed thereon;
   (c) a second material attachment device connected to the channel; and
   (d) a stress relieving fastener disposed on the attachment device for attaching the attachment device to the first nozzle and for relieving thermally induced stresses developed in the attachment device.

2. The nuclear fuel assembly according to claim 1 wherein said fastener comprises a nut having a deformable portion disposed thereon for relieving said stresses.

3. The nuclear fuel assembly according to claim 2 wherein said deformable portion comprises a ridge contacting the bearing surface when the nut is engaged on the attachment device.

4. The nuclear fuel assembly according to claim 3 wherein the ridge is deformable.

5. The nuclear fuel assembly according to claim 4 wherein said ridge is substantially recessed from the marginal edge of said nut.

6. The nuclear fuel assembly according to claim 5 wherein said nut comprises a screw threaded bore formed therethrough along the central longitudinal axis of said nut.

7. The nuclear fuel assembly according to claim 6 wherein the first nozzle comprises a continuous aperture disposed therein.

8. The nuclear fuel assembly according to claim 7 wherein the first nozzle is stainless steel.

9. The nuclear fuel assembly according to claim 8 wherein the attachment device comprises a stud extending from the channel and through the aperture.

10. The nuclear fuel assembly according to claim 9 wherein the stud is Zircaloy.

11. The nuclear fuel assembly according to claim 10 wherein the channel is Zircaloy.

12. The nuclear fuel assembly according to claim 11 wherein said stud comprises helically aligned longitudinal threads disposed on the external end portion thereof.

13. The nuclear fuel assembly according to claim 12 wherein said nut threadedly engages said stud such that said ridge contacts said bearing surface.

14. A nuclear fuel assembly comprising:
   (a) a first material, substantially hollow, rectangular first nozzle having four mutually perpendicular vertical sides and an upwardly facing bearing surface;
   (b) the first nozzle having a vertical, continuous aperture disposed therein;
   (c) a second material, substantially hollow, rectangular channel mounted on the bottom of the first nozzle and having four mutually perpendicular vertical sides substantially in vertical alignment with the vertical sides of the first nozzle;
   (d) a second material stud attached to the channel at a predetermined location, said stud extending from the predetermined location a predetermined distance through the aperture;
   (e) said stud having a substantially L-shape and having a lower horizontal leg thereof attached by an attachment means to an inside surface of the channel at a predetermined location on the inside surface for securing the stud to the channel;
   (f) said stud having a vertical upper leg;
   (g) said stud having the upper leg extending parallel to the channel and having external, helically aligned, longitudinal threads disposed about a predetermined portion of the upper leg;
   (h) said stud having the upper leg extending a predetermined distance through the aperture; and
   (i) a stress relieving fastener disposed on the stud for attaching the stud to the first nozzle and for relieving thermally induced stresses developed in the stud.

15. The nuclear fuel assembly according to claim 14 wherein said fastener further comprises:
   (a) a one-piece generally cylindrical nut containing a continuous screw threaded bore extending from a non-working face of said nut through said nut to a working face of said nut for engaging said nut on the stud;
   (b) a circumferential first groove formed in the lower portion of the nut, said first groove extending circumferentially around the nut in a horizontal plane and horizontally extending a predetermined distance from the outer surface of the nut into said nut toward its central longitudinal axis;
   (c) a rectangularly shaped second groove formed in the bottom most surface of the nut, said second groove upwardly extending a predetermined distance from the bottom most surface of the nut and horizontally extending a predetermined distance into the nut toward its central longitudinal axis;
   (d) a circumferential ridge extending around the working face of the nut, except where the second groove is formed, and disposed directly in contact with the bearing surface, said circumferential ridge contiguous to and integral with said nut; and
   (e) said circumferential ridge extending downwardly a predetermined distance from the working face of the nut and extending a predetermined distance from the marginal edge of said nut toward the center of the working face of said nut for relieving thermally induced stresses developed in the stud.

16. The nuclear fuel assembly according to claim 15 wherein the fuel assembly further comprises:
   (a) a plurality of elongated fuel rods disposed in said channel, said fuel rods having nuclear fuel therein; and
   (b) a second nozzle attached by an attachment means to the bottom portion of said channel.

17. The nuclear fuel assembly according to claim 3 wherein the ridge is deformable.

18. The nuclear fuel assembly according to claim 17 wherein said ridge is disposed substantially flush with the marginal edge of said nut.

19. The nuclear fuel assembly according to claim 18 wherein said deformable portion further comprises a first groove, said first groove extending substantially circumferentially around the external surface of said nut and extending from the marginal edge of said nut to substantially near the central longitudinal axis of said nut.

20. The nuclear fuel assembly according to claim 19 wherein said deformable portion further comprises a second groove formed in the bottom portion of said nut and extending from substantially near the marginal edge of said nut to substantially near the central longitudinal axis of said nut.

21. The nuclear fuel assembly according to claim 20 wherein said nut comprises the bore formed therethrough, said bore extending along the central longitudinal axis of said nut.

22. The nuclear fuel assembly according to claim 21 wherein the first nozzle comprises a continuous aperture disposed therein.

23. The nuclear fuel assembly according to claim 22 wherein the first nozzle is stainless steel.

24. The nuclear fuel assembly according to claim 23 wherein the attachment device comprises a stud extending from the channel and through the aperture.

25. The nuclear fuel assembly according to claim 24 wherein the stud is Zircaloy.

26. The nuclear fuel assembly according to claim 25 wherein the channel is Zircaloy.

27. The nuclear fuel assembly according to claim 26 wherein said stud comprises helically aligned longitudinal threads disposed on the external end portion thereof.

28. The nuclear fuel assembly according to claim 27 wherein said nut threadedly engages said stud such that said ridge contacts said bearing surface.

29. A nuclear fuel assembly comprising:
    (a) a first material, substantially hollow, rectangular first nozzle having four mutually perpendicular vertical sides;
    (b) the first nozzle having a vertical, continuous aperture disposed therein;
    (c) a second material, substantially hollow, rectangular channel mounted on the bottom of the first nozzle and having four mutually perpendicular vertical sides substantially in vertical alignment with the vertical sides of the first nozzle;
    (d) a second material stud attached to the channel at a predetermined location, said stud extending from the predetermined location a predetermined distance through the aperture;
    (e) said stud having a substantially L-shape and having a lower horizontal leg thereof attached by an attachment means to an inside surface of the channel at a predetermined location on the inside surface for securing the stud to the channel;
    (f) said stud having a vertical upper leg;
    (g) said stud having the upper leg extending parallel to the channel and having external, helically aligned, longitudinal threads disposed about a predetermined portion of the upper leg;
    (h) said stud having the upper leg extending a predetermined distance through the aperture; and
    (i) a stress relieving fastener disposed on the stud for attaching the stud to the first nozzle and for relieving thermally induced stresses developed in the stud.

30. The nuclear fuel assembly according to claim 29 wherein said fastener further comprises:
    (a) a one-piece generally cylindrical nut containing a continuous screw threaded bore, said bore extending from a non-working face of said nut through said nut to a working face of said nut for engaging said nut on the stud;
    (b) a deformable ridge extending circumferentially around the working face of the nut and contacting the bearing surface, said ridge contiguous to and integral with said nut for relieving thermally induced stresses; and
    (c) said ridge extending downwardly a predetermined distance from the working face of the nut and disposed at a predetermined location between the marginal edge of said nut and the bore disposed therein.

31. The nuclear fuel assembly according to claim 30 wherein the fuel assembly further comprises:
    (a) a plurality of elongated fuel rods disposed in said channel, said fuel rods having nuclear fuel therein; and
    (b) a second nozzle attached by an attachment means to the bottom portion of said channel.

* * * * *